United States Patent
LeLeannec et al.

(10) Patent No.: US 12,231,686 B2
(45) Date of Patent: Feb. 18, 2025

(54) HYBRID TEXTURE PARTICLE CODING MODE IMPROVEMENTS

(71) Applicant: InterDigital Madison Patent Holdings, SAS, Paris (FR)

(72) Inventors: Fabrice LeLeannec, Betton (FR); Tangi Poirier, Thorigné-Fouillard (FR); Karam Naser, Mouazé (FR); Ya Chen, Rennes (FR); Gaëlle Martin-Cocher, Toronto (CA); Gagan Bihari Rath, Rennes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 23 days.

(21) Appl. No.: 18/012,174

(22) PCT Filed: Jun. 28, 2021

(86) PCT No.: PCT/IB2021/000442
§ 371 (c)(1),
(2) Date: Dec. 21, 2022

(87) PCT Pub. No.: WO2022/003417
PCT Pub. Date: Jan. 6, 2022

(65) Prior Publication Data
US 2023/0328284 A1    Oct. 12, 2023

(30) Foreign Application Priority Data

Jun. 30, 2020    (EP) .................................... 20305736

(51) Int. Cl.
*H04N 19/60*    (2014.01)
*H04N 19/117*    (2014.01)
(Continued)

(52) U.S. Cl.
CPC ........... *H04N 19/60* (2014.11); *H04N 19/117* (2014.11); *H04N 19/124* (2014.11); *H04N 19/176* (2014.11)

(58) Field of Classification Search
CPC .. H04N 19/117; H04N 19/124; H04N 19/176; H04N 19/60; H04N 19/61
(Continued)

(56) References Cited

U.S. PATENT DOCUMENTS

| | | | |
|---|---|---|---|
| 2013/0294524 A1* | 11/2013 | Van Der Auwera ... | H04N 19/60 375/240.18 |
| 2014/0050265 A1* | 2/2014 | Joshi ..................... | H04N 19/147 375/240.12 |

(Continued)

OTHER PUBLICATIONS

Lin, Tao et al, "4:4:4 Screen Content Coding using Dual-coder Mixed Chroma-sampling-rate (DMC) Techniques", JTCVC-I0272, Apr. 27-May 7, 2012, 17 pages.

(Continued)

*Primary Examiner* — Christopher S Kelley
*Assistant Examiner* — Ana Picon-Feliciano
(74) *Attorney, Agent, or Firm* — Smadar Gefen

(57) ABSTRACT

Video content frequently seen in gaming content and having a higher probability of being coded in transform skip mode is coded separately from remaining portions of a video coding block before being combined with regular coded portions. This enables more efficient coding of video by reducing the switching between regular coding modes and transform skip modes. The regular coded portion and the transform skip coded portion are combined in an encoder. At a corresponding decoder, inverse operations occur, such that the transform skipped residual portions are decoded and the regularly coded portions are decoded before the portions are combined for a resultant decoded video block.

26 Claims, 20 Drawing Sheets

(51) Int. Cl.
*H04N 19/124* (2014.01)
*H04N 19/176* (2014.01)

(58) Field of Classification Search
USPC .................................................. 375/240.18
See application file for complete search history.

(56) References Cited

U.S. PATENT DOCUMENTS

2018/0176556 A1\* 6/2018 Zhao ................... H04N 19/176
2020/0322623 A1\* 10/2020 Chiang ................ H04N 19/625
2021/0337204 A1\* 10/2021 Choi ................... H04N 19/124
2021/0352326 A1\* 11/2021 Lim .................... H04N 19/176
2021/0383117 A1\* 12/2021 Grancharov ......... G06V 10/993

OTHER PUBLICATIONS

Bross et al, "Versatile video coding (draft 9)", Joint Video Experts Team (JVET) of ITU-T SG 16 WP 3 and ISO/IEC JTC 1/SC 29/WG 11, Document: JVET-R2001-vA, 18th Meeting, by teleconference, Apr. 15, 2020, 524 pages.

\* cited by examiner

HYBRID TEXTURE PARTICLE CODING MODE IMPROVEMENTS

CROSS REFERENCE TO RELATED APPLICATIONS

This application is a U.S. National Stage Application under 35 U.S.C. 371 of International Patent Application No. PCT/IB2021/000442, filed Jun. 28, 2021, which is incorporated herein by reference in its entirety.

This application claims priority to and the benefit of European Patent Application No. 20305736.9, filed Jun. 30, 2020, which is incorporated herein by reference in its entirety.

FIELD OF THE INVENTION

The present disclosure relates to video compression and more particularly to the compression and decompression of content such as video gaming content.

BACKGROUND OF THE INVENTION

Many attempts have been made to improve the coding efficiency of block-based codecs. The VVC (Versatile Video Coding, H.266) compression scheme is the next generation of video compression beyond HEVC (High Efficiency Video Coding). When the VVC video compression system operates on typical gaming content, less than optimal coding could occur.

SUMMARY OF THE INVENTION

These and other drawbacks and disadvantages of the prior art are addressed by the present described embodiments, which are directed to a method and apparatus to manage a trade-off between the coding efficiency provided by quantization matrices and encoding and decoding complexity.

According to an aspect of the described embodiments, there is provided a method. The method comprises steps for determining isolated samples from a residual of a video image; filtering the isolated samples from the residual; transform encoding the filtered residual; reconstructing the filtered residual; subtracting the reconstructed filtered residual from the residual to form a particle residual; entropy coding the particle residual using a transform skip mode; and combining the entropy coded particle residual with the transform encoded filtered residual According to another aspect of the described embodiments, there is provided a second method. The method comprises steps for decoding a residual of a first portion of a video block to generate a reconstructed particle residual; entropy decoding a second portion of the video block; and combining the reconstructed particle residual and the entropy decoded second portion of the video block.

According to another aspect of the described embodiments, there is provided an apparatus. The apparatus comprises a memory and a processor. The processor can be configured to encode or decode a portion of a video signal by any of the above mentioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

According to another general aspect of at least one embodiment, an encoder scheme is provided combining a decreased signal step to reduce an amplitude of a signal of a transform skip part of a residual.

According to another general aspect of at least one embodiment, an increase signal step is added after inverse quantization of the transform skip part of a signal.

These and other aspects, features and advantages of the present principles will become apparent from the following detailed description of exemplary embodiments, which is to be read in connection with the accompanying drawings.

DETAILED DESCRIPTION

The domain of the described embodiments is video compression, more specifically the coding and decoding of hybrid texture particles.

The problem solved by the invention is to enhance the coding efficiency of standard video codecs on specific video contents to compression/de-compress. In particular, the video coding use case envisioned is the compression and decompression of video game content, which takes place in emerging cloud gaming services.

The video compression system considered as a reference is VVC draft 8. It has been observed that when running on a typical gaming vide, the encoder is switching frequently, at block level, between the traditional transform coding mode and the transform skip coding mode. This particularly happens on picture areas which contains specific texture types, made of both natural low-pass texture type, and co-called particle texture type.

Here particle texture type stands for isolated samples, typically in luma component, which have a value significantly different from their neighboring samples in the considered picture component.

Such particle sample are difficult to encode efficiently through classical transform-based coding, which represents the signal to code in the frequency domain to make it efficiently compressible. On the other hand, another block coding mode is supported in VVC, called transform skip, which bypass the transform step. This mode is coupled with a specific transform skip block residual entropy coding process, noted TSRC (Transform Skip Residual Coding). It is typically adapted to screen content video type. The transform skip mode thus appears much more adapted to the coding of particle luma samples, since it directly codes the sample values. However, it is not efficient for coding natural texture content, which mainly consists in low spatial frequencies.

Consequently, for texture type which combine low-pass texture and particle samples, none of the transform based or transform skip modes supported in VVC seem optimal for coding efficiency.

The problem solved by this invention is to design a block coding mode which outperform both transform-based and transform skip modes for a coding unit (=block) which would comprise both a low-pass texture signal and some particle texture type.

The basic proposal of this invention is a hybrid block coding mode, which combines the use of the non-transform-skip coding mode and of the transform-skip coding mode at the block level. This new coding mode is chosen on the coding unit (CU) level, and its use is signaled through a dedicated syntax element transmitted in the coded bitstream.

Figure 3:
FIG. 3 illustrates typical gaming video content to compress

FIG. 3 shows a typical video picture extracted from a video game. It can be seen that many isolated samples with a value quite different from their surrounding samples are part of this content.

Figure 4:
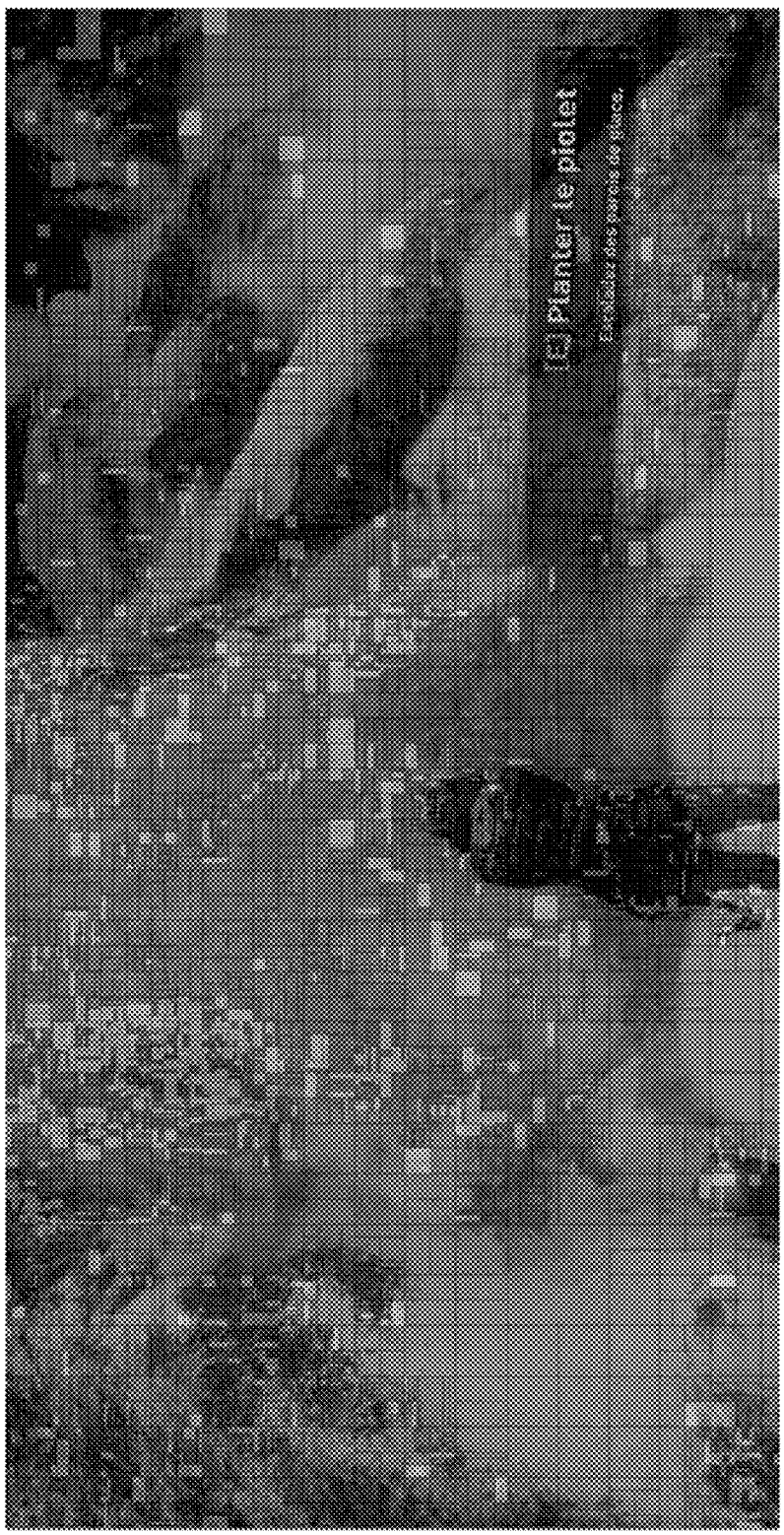
FIG. 4 shows block partitioning and regular/transform-skip coding modes chosen by the encoder.

FIG. 4 shows the block partitioning and the transform skip/regular residual coding modes chosen by the VVC encoder on the video picture of FIG. 3. It can be seen a number of blocks are coded in transform skip mode.

Figure 5:
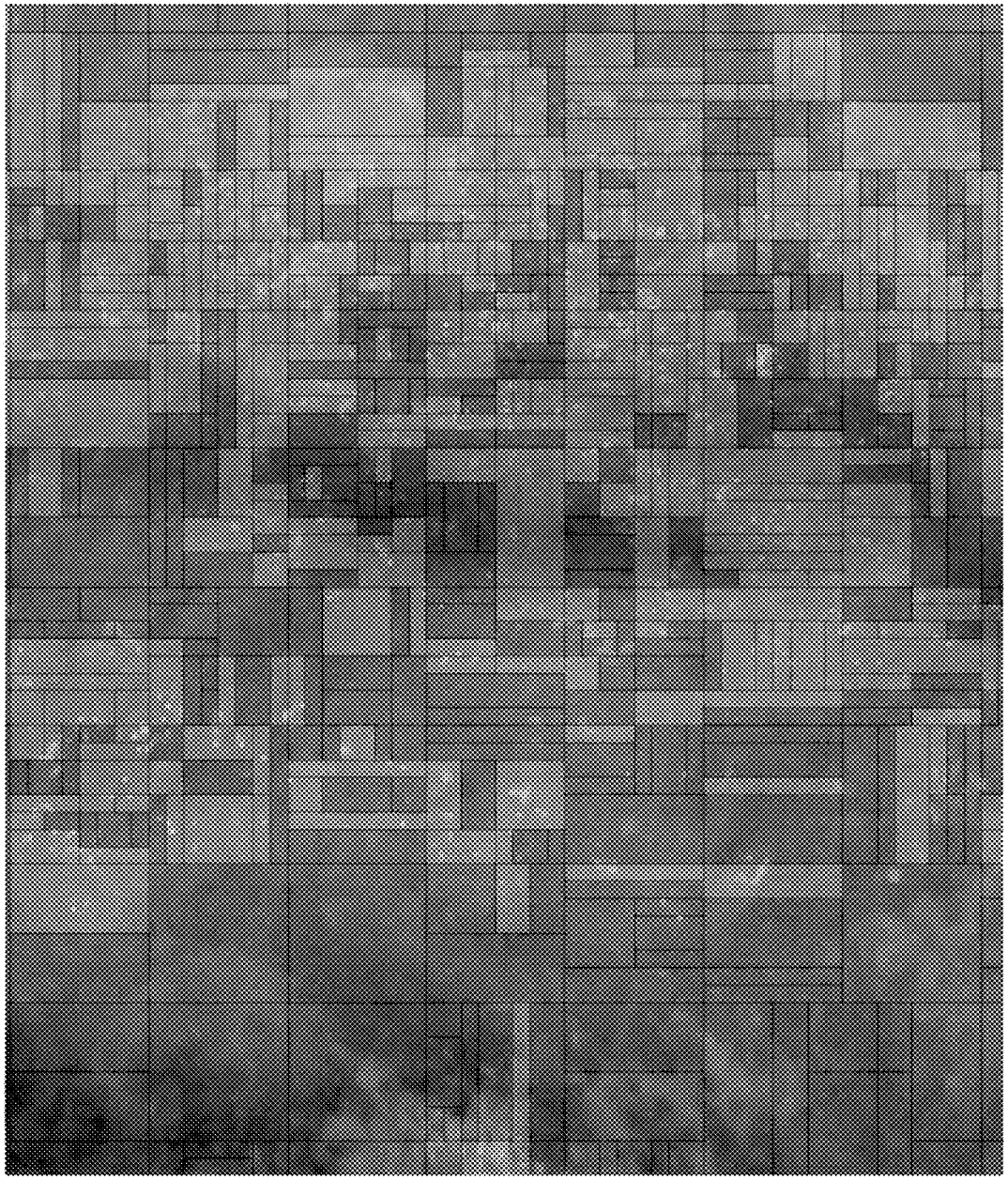
FIG. 5 shows partitioning into coding units and transform skip (yellow) and regular (red) coding modes chosen by the VVC encoder.

FIG. 5 shows a clearer view of which type of input blocks are coded in TS (transform skip) mode. One sees that TS is chosen for blocks which contain some isolated singular valued luma samples, i.e. which have a luma value very different from their neighboring luma samples. It is observed that a high amount of blocks are coded in transform skip mode, while one knows that transform skip is mainly efficient for a very specific type of video content, i.e. screen content with very flat area in terms of sample values. This is confirmed by Table 1, which shows that by deactivating the Transform Skip mode, a big loss is observed essentially for some content of the screen content class F of the VVC testing conditions, mainly sequences made of slide editing pictures, text, etc. Thus, we believe the high usage of transform skip on the shown gaming content reveals the regular transform is not performing well, but the transform skip mode of VVC is probably not very efficient either.

TABLE 1

VVC performances when deactivating the transform skip mode, compared to the VVC performances when keeping the transform skip mode activated.

| | All Intra Main10 Over VTM-8.0-noBDPCM | | | | |
|---|---|---|---|---|---|
| | Y | U | V | EncT | DecT |
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | 0.09% | −0.11% | −0.03% | 97% | 96% |
| Class C | 0.58% | 0.32% | 0.23% | 95% | 100% |
| Class E | 0.18% | −0.17% | 0.31% | 95% | 102% |
| Overall | #VALUE! | #VALUE! | #VALUE! | #DIV/0! | #DIV/0! |
| Class D | 0.45% | 0.28% | 0.45% | 93% | 96% |
| Class F | 11.38% | 9.24% | 9.84% | 96% | 107% |

Figure 6:
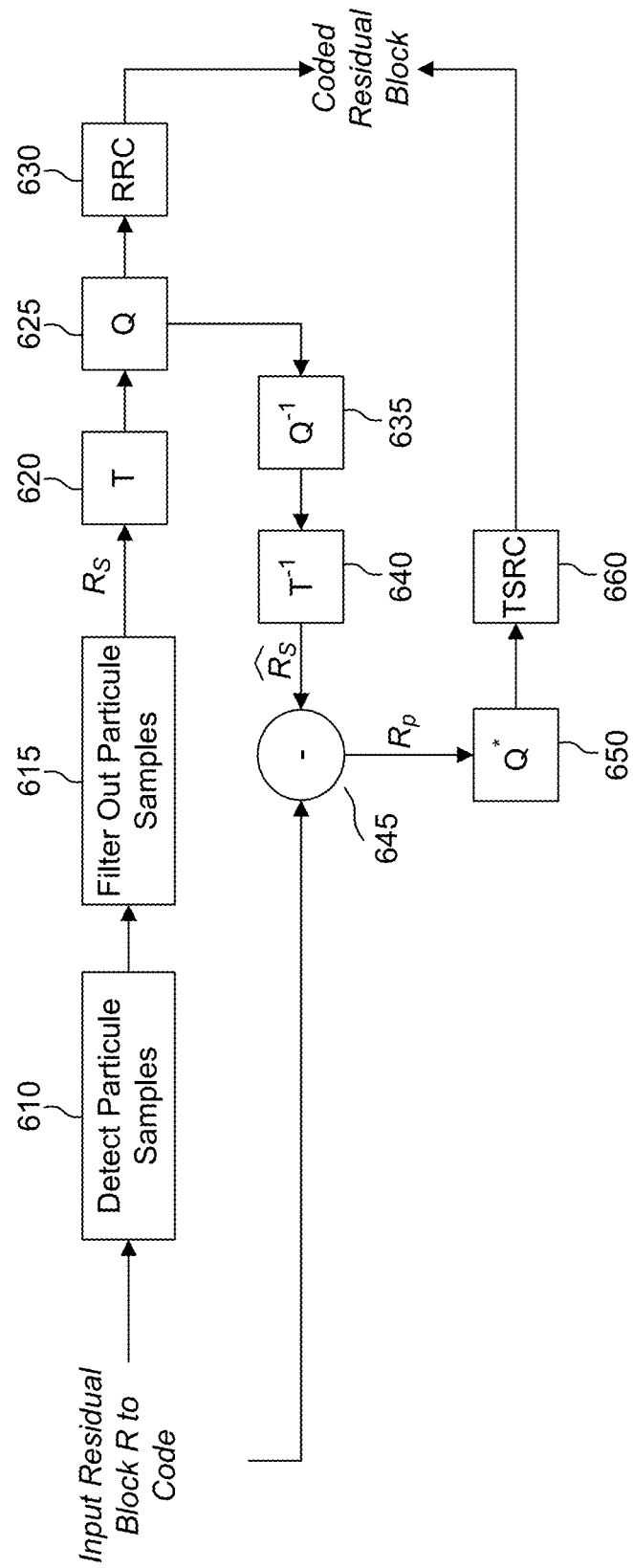
FIG. 6 shows first proposed embodiment for a hybrid texture/particle residual block encoding.

FIG. 6 shows the proposed new block residual coding mode for a block residual. It consists in cascading a regular transform-based coding process together with a transform skip coding of the residual block samples. The input to the process is a residual block R issued from a inter or intra prediction process of the considered block, followed by the subtraction of the prediction from the original block.

The first step of the process consists in detecting the particle samples that may exist in the considered block. This is an encoder only, non-normative, stage. It may consist in a simple isolated sample detection method, for instance by applying a 2D convolution of the input original block with the following 3×3 2D mask:

$$\begin{bmatrix} -1 & -1 & -1 \\ -1 & 8 & -1 \\ -1 & -1 & -1 \end{bmatrix}$$

By thresholding, the output of this convolution, an isolated sample $f_5$ with neighbors $f_1$ to $f_9$ is said to be isolated if:

$$|8f_5-(f_1+f_2+f_3+f_4+f_6+f_7+f_8+f_9)|>T,$$

where T is a pre-specified positive threshold.

Other methods, gradient based, Laplacian based or using morphological gradient may also be used.

Once these isolated sample values are detected, they are filtered out from the residual block by replacing them by a sample value similar to the neighboring samples' values. Typically, the average of the neighboring samples computed over a given 2D mask may be used, or the median value.

This leads to a smooth component $R_s$ of the input residual block, which is adhoc to a regular transform-based coding. This regular coding takes place, involving a transform T, and quantization Q and the entropy coding of the so-quantized coefficients.

Then the regular-coded smooth residual block is reconstructed through inverse quantization $Q^{-1}$ and inverse transform $T^{-1}$.

Next, the reconstructed smooth block $\widehat{R_s}$ part of the residual block is subtracted from the original residual block R, leading to the particle oriented component $R_p$ of the current residual block to code:

$$R_p = R - \widehat{R_s}$$

The particle residual block is then quantized (step Q*) with a quantization step $Q^*_{step}$, which may be equal or different from the regular quantization step $Q_{step}$. The quantized particle residual block $\widehat{R_p}$ is then entropy coded. To do so, the transform skip entropy coding mode of VVC is employed instead of the regular residual coding process.

Figure 7:
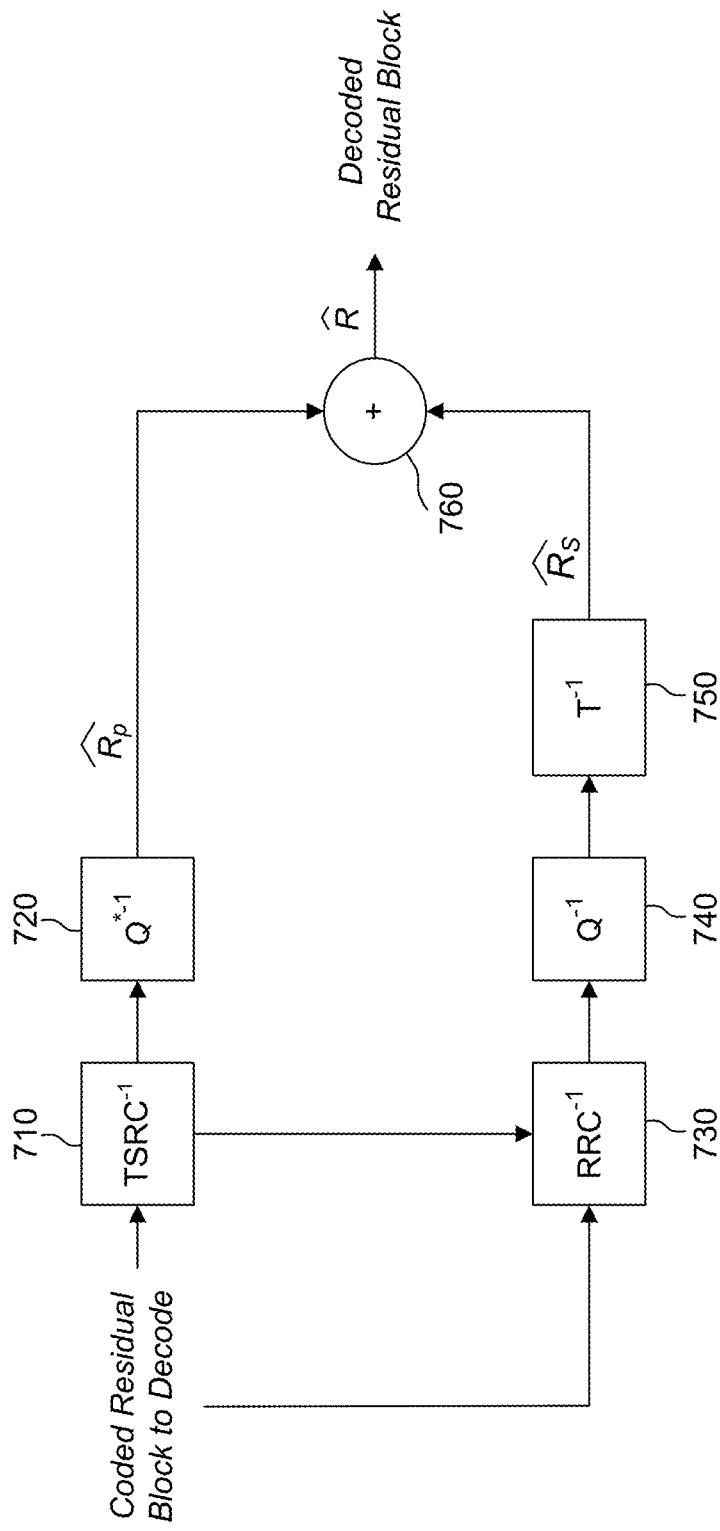
FIG. 7 shows first proposed embodiment for a hybrid texture/particle residual block decoding.

FIG. 7 depicts residual the decoding process associated to the coding process of FIG. 6. The input to this process is the entropy coded residual block issued from the process of FIG. 6. The first step is the transform skip residual decoding process, noted $TSRC^{-1}$. It leads to the quantized particle residual block contained in the considered coded residual block. Inverse quantization $Q^{*-1}$ is then applied with the quantization step $Q^*_{step}$, leading to the reconstructed particle residual $\widehat{R_p}$.

On the other side of the decoding process, the regular residual entropy decoding process, noted $RRC^{-1}$, is applied. This leads to the quantized smooth residual block contained in the considered overall residual block. It then undergoes the inversion quantization step $Q^{-1}$ with quantization $Q_{step}$. The inverse quantized residual smooth part of the current block is then inverse transform (step $T^{-1}$), leading to the reconstructed smooth residual block $\widehat{R_s}$.

The final step of the hybrid smooth/particle residual block decoding process then consists in adding the two reconstructed residuals $\widehat{R_p}$ and $\widehat{R_s}$, leading to the final reconstructed residual block $\hat{R}$.

Figure 8:
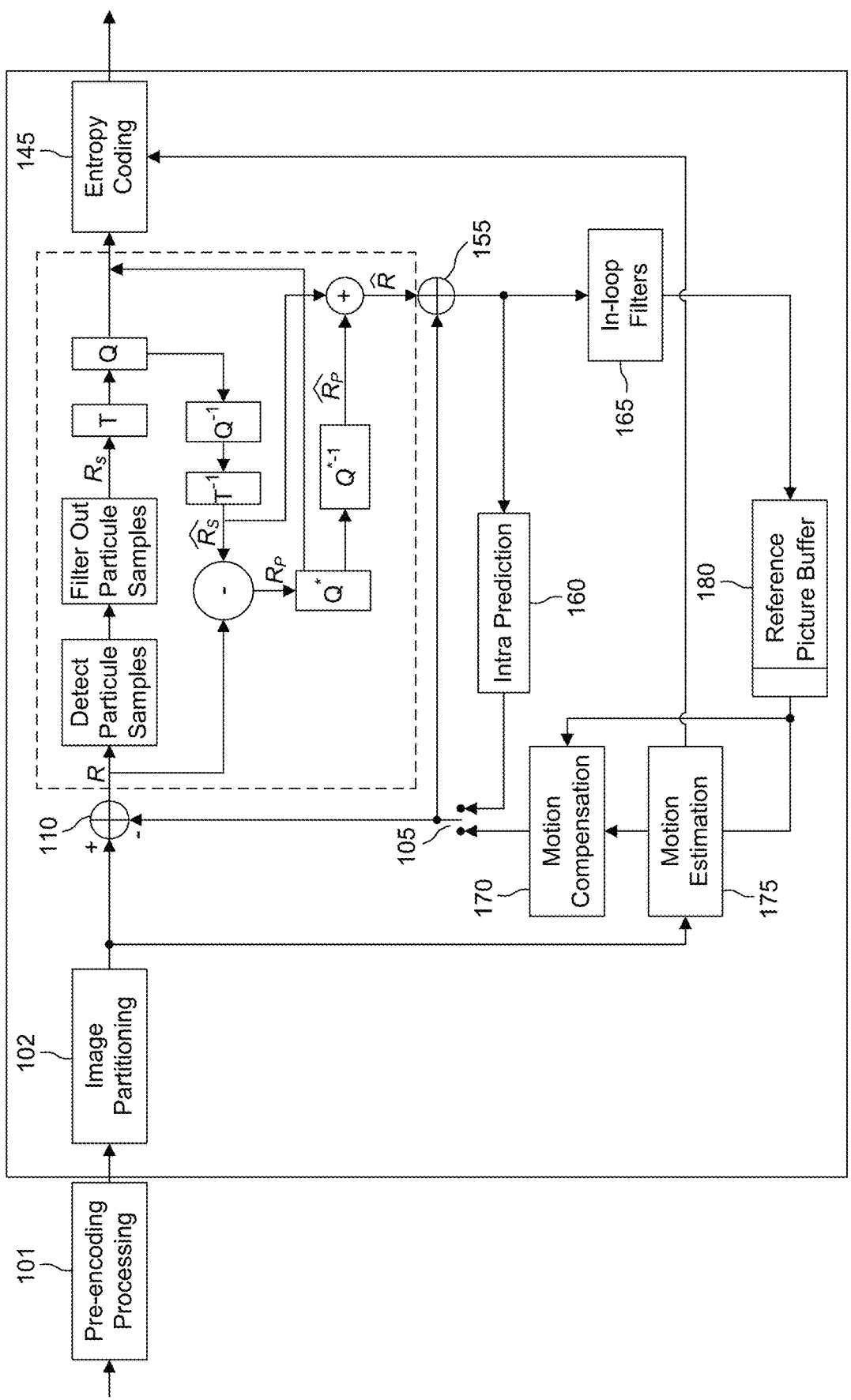
FIG. 8 shows overall video encoding scheme according to the proposed first embodiment.

FIG. 8 provides the overall video encoder diagram block according to the proposed first embodiment, for a coding unit which coded with the proposed hybrid regular/particle coding mode.

As can be seen the proposed residual coding process, which involves both the VVC transform-based coding process and the transform skip coding process of VVC, replaces the tradition coding process of a residual block, for the considered coding unit.

The proposed decoding process, proposed in FIG. 7, also takes place to produce the reconstructed residual block associated to the considered coding unit. Once it is reconstructed (residual block $\hat{R}$), it is then added to the inter or intra predicted block, to generate the final reconstructed coding unit.

Figure 9:
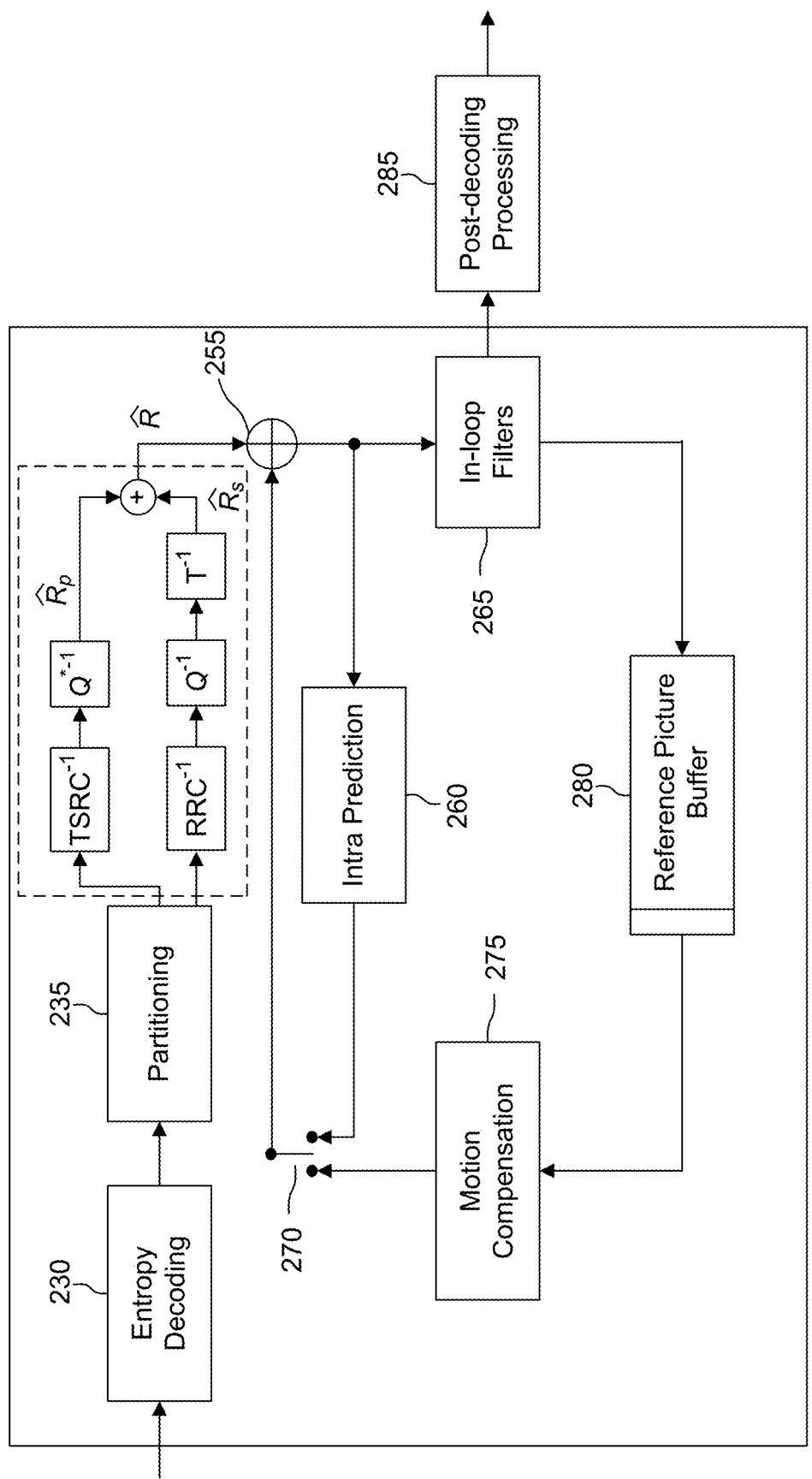
FIG. 9 shows overall video decoding scheme according to the proposed first embodiment.

FIG. 9 provides the overall video encoder diagram block according to the proposed first embodiment, for a coding unit which coded with the proposed hybrid regular/particle coding mode.

As can be seen the proposed residual coding process, which involves both the VVC transform-based coding process and the transform skip coding process of VVC, replaces the tradition decoding process of a residual block, for the considered coding unit.

Once it is reconstructed (residual block $\hat{R}$), it is then added to the inter or intra predicted block, to generated to final reconstructed coding unit.

This section describes the second embodiment proposed for a hybrid regular/particle block coding mode.

Figure 10:
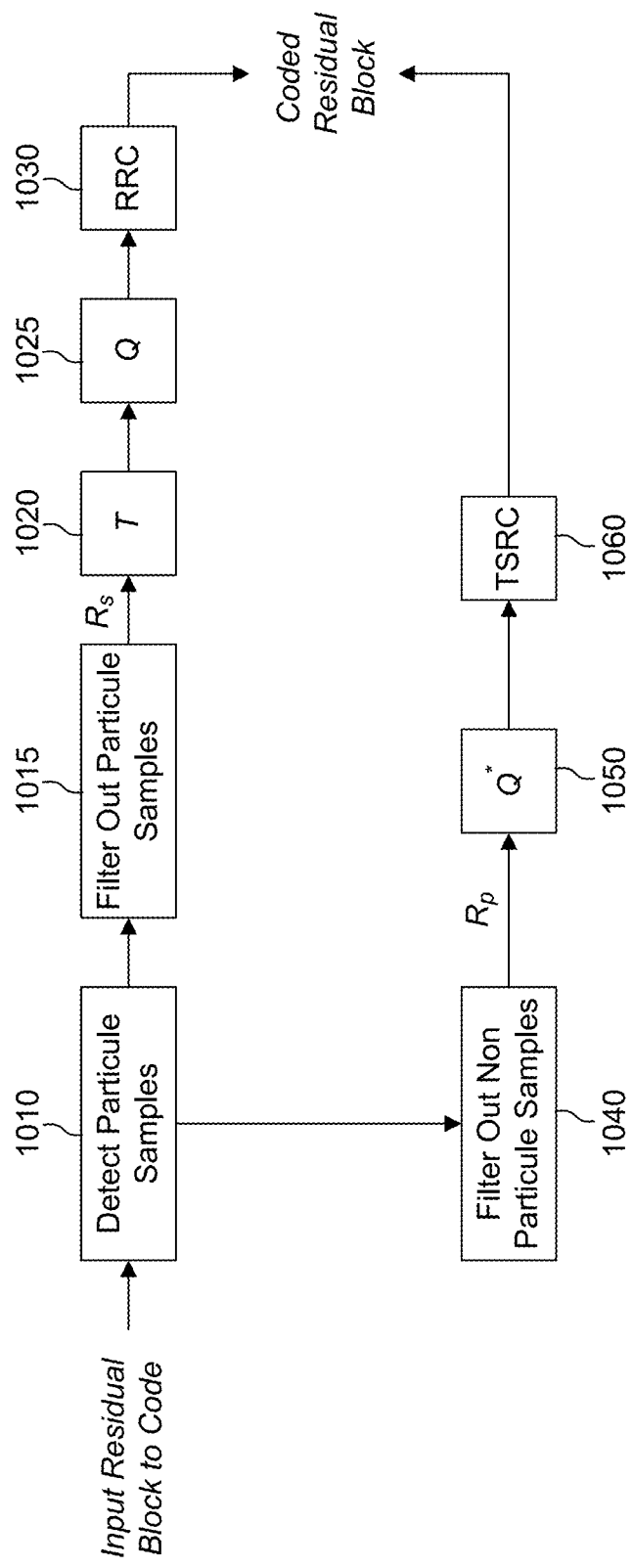
FIG. 10 shows second proposed embodiment for a hybrid texture/particle residual block encoding.

The encoder side coding process is illustrated by FIG. 10. The input to the process is a residual block R issued from a inter or intra prediction process of the considered block, followed by the subtraction of the prediction from the original block.

The first step of the process consists in detecting the particle samples that may exist in the considered block, which is the same process as the corresponding step of FIG. 6.

Once these isolated sample values are detected, they are filtered out from the residual block by replacing them by a sample value similar to the neighboring samples' values. Typically, the average of the neighboring samples computed over a given 2D mask may be used, or the median value.

This leads to a smooth component $R_s$ of the input residual block, which is adhoc to a regular transform-based coding. This regular coding takes place, involving a transform T, and quantization Q and the entropy coding of the so-quantized coefficients.

Next, the particle oriented component $R_p$ of the current residual block to code is formed by forming a separate residual block made of zero samples combined with the extracted isolated particle samples.

The particle residual block is then quantized (step Q*) with a quantization step $Q^*_{step}$, which may be equal or different from the regular quantization step $Q_{step}$. The quantized particle residual block $\widehat{R_p}$ is then entropy coded. To do so, the transform skip entropy coding mode of VVC is employed instead of the regular residual coding process.

Figure 11:
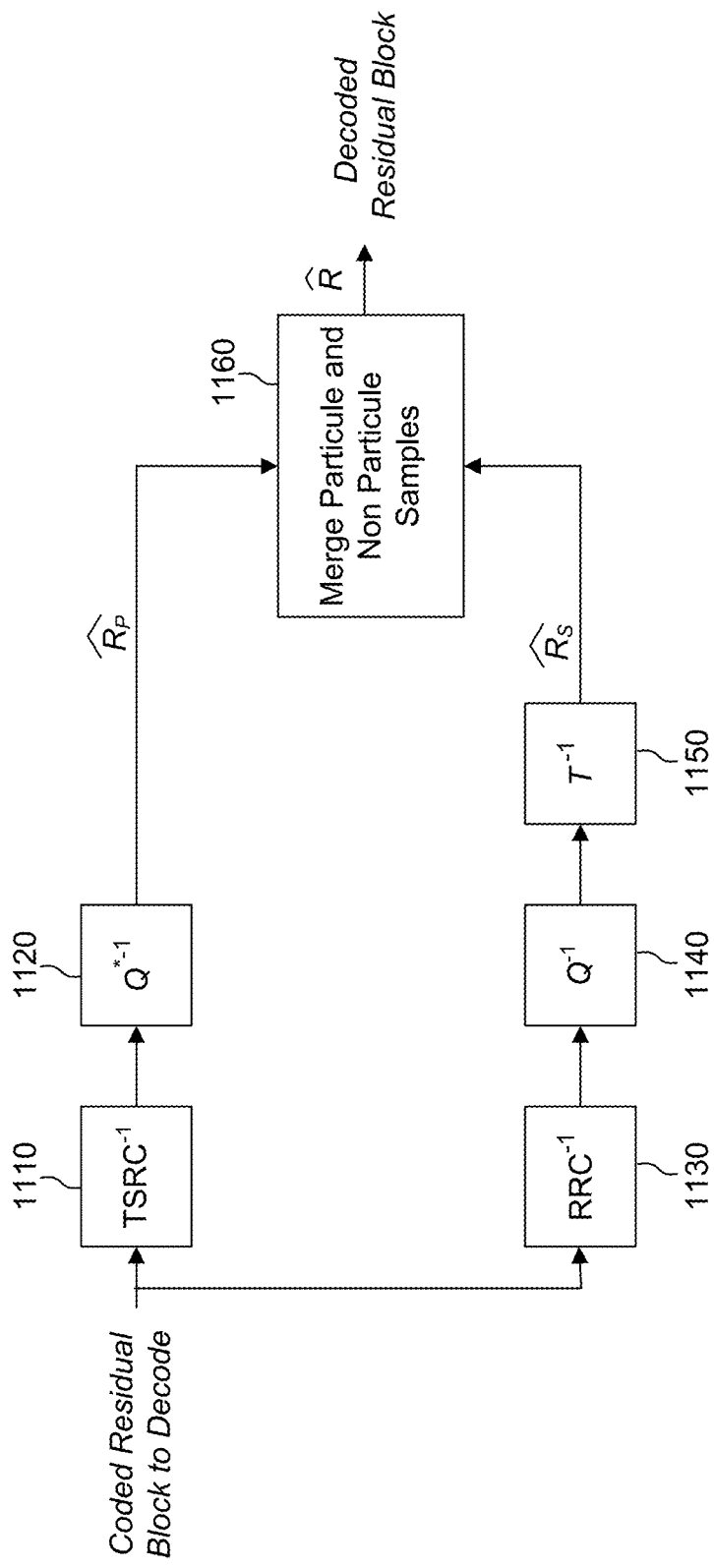
FIG. 11 shows second proposed embodiment for a hybrid texture/particle residual block decoding.

FIG. 11 depicts residual the decoding process associated to the coding process of FIG. 10. The input to this process is the entropy coded residual block issued from the process of FIG. 6. The first step is the transform skip residual decoding process, noted $TSRC^{-1}$. It leads to the quantized particle residual block contained in the considered coded residual block. Inverse quantization $Q^{*-1}$ is then applied with the quantization step $Q^*_{step}$, leading to the reconstructed particle residual $\widehat{R_p}$.

On the other side of the decoding process, the regular residual entropy decoding process, noted $RRC^{-1}$, is applied. This leads to the quantized smooth residual block contained in the considered overall residual block. It then undergoes the inversion quantization step $Q^{-1}$ with quantization $Q_{step}$. The inverse quantized residual smooth part of the current block is then inverse transform (step $T^{-1}$), leading to the reconstructed smooth residual block $\widehat{R_s}$.

The final step of the hybrid smooth/particle residual block decoding process then consists in merging the two reconstructed residuals $\widehat{R_p}$ and $\widehat{R_s}$, leading to the final reconstructed residual block $\hat{R}$. This merging process consists in replacing reconstructed samples in the residual block $\widehat{R_s}$ at spatial positions corresponding to non-zero reconstructed particle samples, by the value of the reconstructed particle sample at same location in the residual block $\widehat{R_p}$.

According to a variant of the encoder side particle sample out filtering of FIG. 6 and FIG. 10 to compute the smooth residual $R_s$ to encode, the filtering process consists in determining the $R_s$ samples values at particle samples positions, in such a way that optimizes the efficiency of the coding of the $R_s$ smooth residual block. Typically, this may consist in finding particle samples values that leads to the minimal $L_1$ norm of the residual block $R_s$ in the transform domain, with respect to the transform T used for the coding of $R_s$ in the considered CU.

According to an embodiment, the proposed hybrid regular/particle coding mode is chosen at the coding unit level by the encoder through a rate distortion optimization process. This rate distortion optimization chooses the CU coding mode with the minimum associated rate distortion cost. Therefore, the proposed coding mode is put in competition with other CU coding modes by the encoder.

According to an embodiment, the usage of the proposed hybrid regular/particle coding mode is signaled through a CU-level flag. According to an embodiment, the flag indicating the use of the proposed hybrid CU coding mode is signaled in case the transform skip flag of the considered CU is equal to true. Otherwise it is not coded and is inferred to false by the decoder.

Finally, according to a variant of the encoding process of the first proposed embodiment, no particle detection and filter is performed. On the contrary, it is assumed that the high frequency energy generated by the particle samples in the transform domain is discarded during the quantization of high frequency transform coefficients. Therefore, no detection and filtering of the particle samples may be needed. This leads to the simplified encoding process illustrated by FIG. 12.

Figure 12:
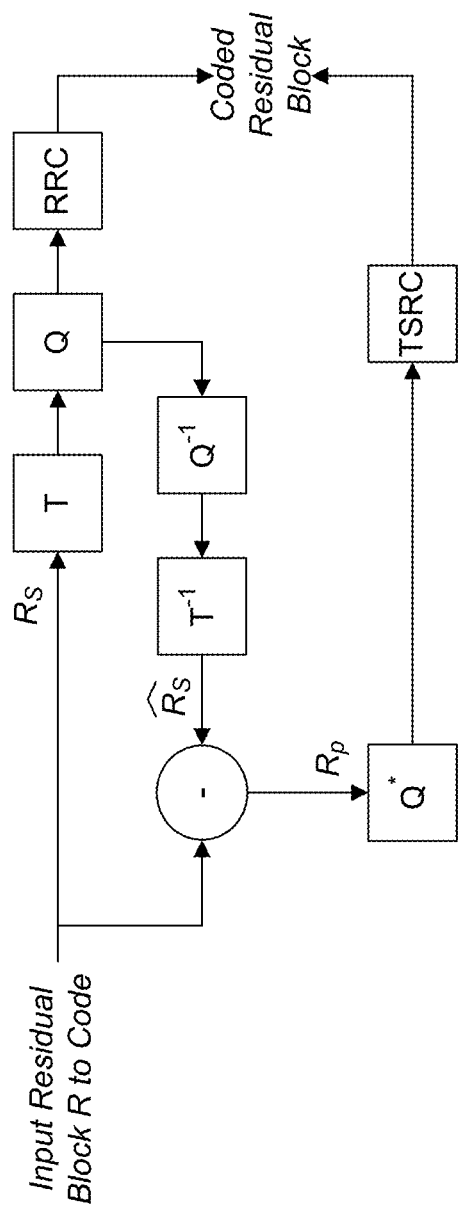
FIG. 12 shows a variant of the encoding process associated to the first proposed embodiment.

According to a variant of the encoding process of FIG. 12, transform coefficients with a frequency level higher than some threshold are simply forced to zero before being encoded, assuming that the corresponding high frequency information will be coded properly by the transform skip coding stage that follows.

According to another embodiment, a scalar quantizer Q* is used for the quantization and inverse quantization of the particle samples. In particular, a specific deadzone, i.e. the quantization interval that contains the zero sample value, with an enlarged size compared to the standard VVC quantizer, is used in the quantizer Q*, in order to discard all the sample which are not that particle samples that are supposed to be coded in the $R_p$ residual block.

Figure 13:
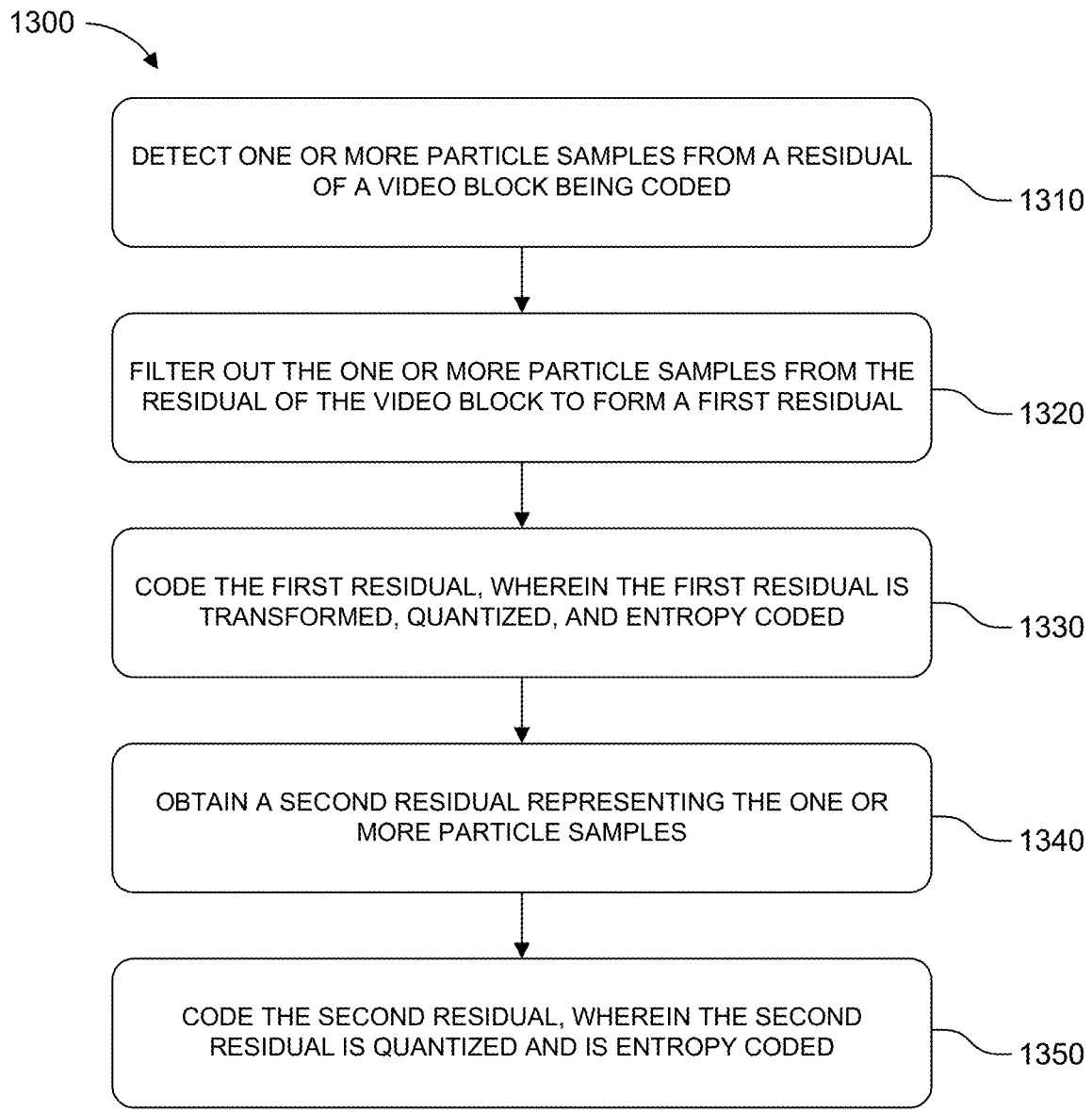
FIG. 13 illustrates a method for encoding video according to aspects.

FIG. 13 is a flowchart illustrating a method 1300 for video coding, according to aspects described herein. Method 1300 may be described with respect to FIG. 6 and FIG. 10 as follows. In step 1310, one or more particle samples are detected 610, 1010, from a residual R of a video block being coded. In step 1320, the detected one or more particle samples are filtered out 615, 1015 from the residual of the video block to form a first residual, $R_s$. In step 1330, the first residual is coded, where the first residual is transformed 620, 1020, quantized 625, 1025, and entropy coded 630, 1030. In step 1340, a second residual, $R_p$, that represents the one or more particle samples, is obtained. In an aspect, the second residual is obtained by reconstructing 635, 640 the coded first residual, obtaining the reconstructed first residual $\hat{R}_s$, and then subtracting 645 $\hat{R}_s$ from the residual R of the video block to form the second residual $R_p$. In another aspect, the second residual is obtained by forming 1040 the second residual out of the detected one or more particle samples, where the remaining samples are set to zero. In step 1350, the second residual is coded, where the second residual is quantized 650, 1050 and is then entropy coded 660,1060.

Figure 14:
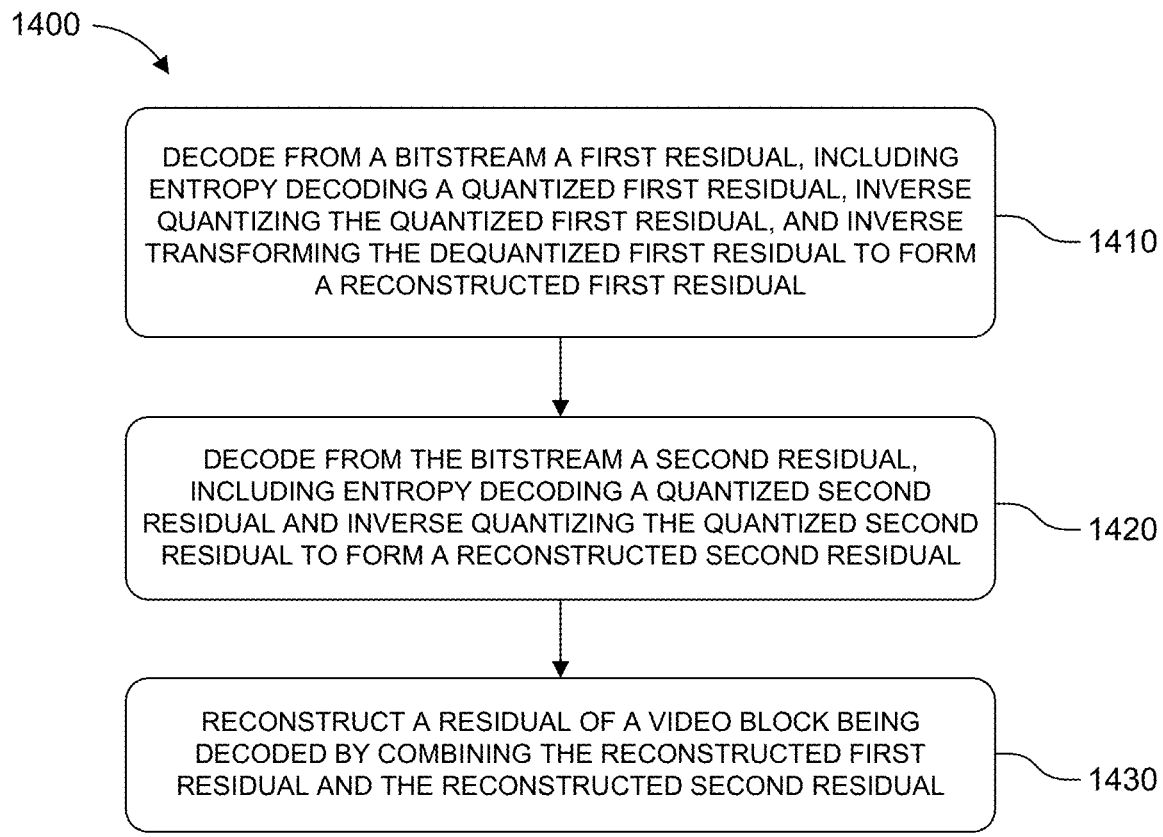
FIG. 14 illustrates a method for decoding video according to aspects.

FIG. 14 is a flowchart illustrating a method 1400 for video decoding, according to aspects described herein. Method 1400 may be described with respect to FIG. 7 and FIG. 11 as follows. In step 1410, a first residual is decoded from the bitstream, including entropy decoding 730 a quantized first residual, inverse quantizing 740 the quantized first residual, and inverse transforming 750 the dequantized first residual to form a reconstructed first residual $\hat{R}_s$. In step 1420, a second residual is decoded from the bitstream, including entropy decoding 710 a quantized second residual and inverse quantizing 720 the quantized second residual to form a reconstructed second residual $\hat{R}_p$. In step 1430, a residual of a video block being decoded is reconstructed $\hat{R}$ by combining the reconstructed first residual $\hat{R}_s$ and the reconstructed second residual $\hat{R}_p$. In an aspect, combining $\hat{R}_s$ and $\hat{R}_p$ is performed by adding 760. In another aspect, combining $\hat{R}_s$ and $\hat{R}_p$ is performed by merging 1160.

Figure 15:
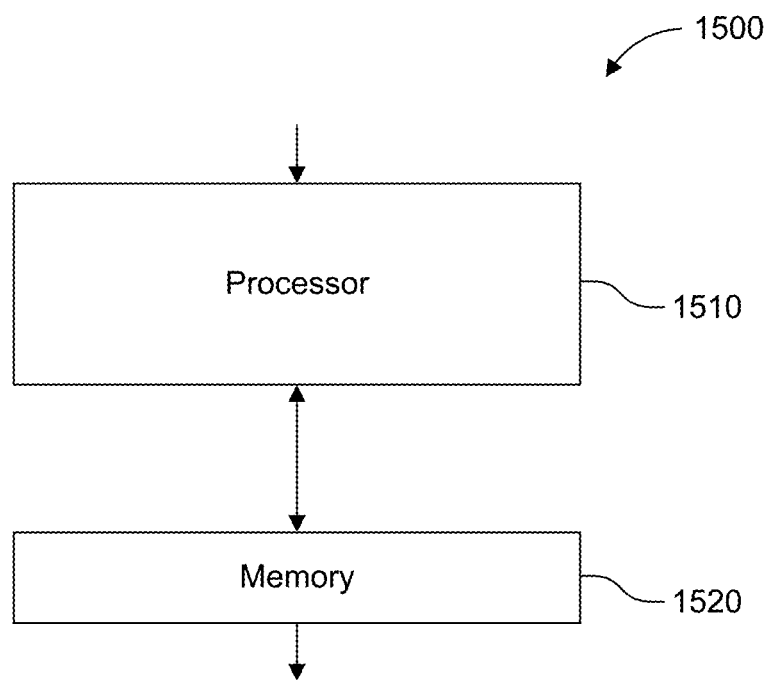
FIG. 15 a processor based system for encoding/decoding.

FIG. 15 shows one embodiment of an apparatus 1500 for compressing, encoding or decoding video using coding or decoding tools. The apparatus comprises Processor 1510 and can be interconnected to a memory 1520 through at least one port. Both Processor 1510 and memory 1520 can also have one or more additional interconnections to external connections.

Processor 1510 is also configured to either insert or receive information in a bitstream and, either compressing, encoding or decoding using various coding tools.

In another aspect, a combination of described embodiments with either DCT-II or DST-IV is disclosed. Zeroing-out of high frequency coefficients for the regular transform and QP offset for either regular or transform skip part is also described. Then the use of implicit transform in combination with transform skip is also proposed.

Normative Improvements

High-Level Flag to Signal Hybrid Transform Skip

A sps flag is added to enable/disable the use of hybrid transform skip mode. This flag is coded only if sps_transform_skip_enabled_flag is true, the proposed syntax is shown in Table 2.

TABLE 2

SPS flag to enable hybrid transform skip mode

| | Descriptor |
|---|---|
| seq_parameter_set_rbsp( ) { | |
|   sps_seq_parameter_set_id | u(4) |
|   .... | |
|   sps_transform_skip_enabled_flag | u(3) |
|   if( sps_transform_skip_enabled_flag ) { | u(2) |
|     sps_log2_transform_skip_max_size_minus2 | ue(v) |
|     sps_bdpcm_enabled_flag | u(1) |
|     sps_hybrid_transform_skip_enabled_flag | u(1) |
| } | |

Semantics Associated with the Proposed Syntax:
sps_hybrid_transform_skip_enabled_flag equal to 1 specifies that hybrid_transform_skip_flag could be present in the transform unit syntax. sps_hybrid_transform_skip_enabled_flag equal to 0 specifies that hybrid transform_skip_flag is not present in the transform unit syntax.

Combination with DST-IV

In this embodiment, hybrid texture may be used in combination with either DCT-II or DST-IV as they are the 2 most used transform in Intra slices. Two hybrid modes may be used: DCT-II/TrSkip and DST-IV/TrSkip.

A first flag is coded after the transform_skip_flag to indicate if hybrid_transform_skip mode is used ( ). Then a second flag is used if mts conditions are satisfied. If it is, a second flag is coded to indicate if hybrid DST-IV/TrSkip is used or DCT-II/TrSkip is used.

TABLE 3

Proposed hybrid_Transform_skip_flag syntax

|  | Descriptor |
|---|---|
| transform_unit( x0, y0, tbWidth, tbHeight, treeType, subTuIndex, chType ) { | |
| ..... | |
|   if( tu_y_coded_flag[ x0 ][ y0 ] && treeType != DUAL_TREE_CHROMA ) { | |
|     if( sps_transform_skip_enabled_flag && | |
|     !BdpcmFlag[ x0 ][ y0 ][ 0 ] && | |
|       tbWidth <= MaxTsSize && tbHeight <= MaxTsSize && | |
|       ( IntraSubPartitionsSplitType == ISP_NO_SPLIT ) && !cu_sbt_flag ) | |
|       transform_skip_flag[ x0 ][ y0 ][ 0 ] | ae(v) |
|     if( transform_skip_flag[ x0 ][ y0 ][ 0 ] ) | |
|       hybrid_transform_skip_flag[ x0 ][ y0 ][ 0 ] | |
|     if( !transform_skip_flag[ x0 ][ y0 ][ 0 ] \|\| | |
|     sh_ts_residual_coding_disabled_flag | |
|       \|\| hybrid_transform_skip_flag[ x0 ][ y0 ][ 0 ] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|     if( hybrid_transform_skip_flag[ x0 ][ y0 ][ 0 ] ) | |
|       residual_ts_coding( x0, y0, Log2( tbWidth ), Log2( tbHeight ), 0 ) | |
|   } | |
|   if( tu_cb_coded_flag[ xC ][ yC ] && treeType != DUAL_TREE_LUMA ) { | |
|     if( sps_transform_skip_enabled_flag && | |
|     !BdpcmFlag[ x0 ][ y0 ][ 1 ] && | |
|       wC <= MaxTsSize && hC <= MaxTsSize && | |
|       !cu_sbt_flag ) | |
|       transform_skip_flag[ xC ][ yC ][ 1 ] | ae(v) |
|     if( !transform_skip_flag[ xC ][ yC ][ 1 ] \|\| sh_ts_residual_coding_disabled_flag ) | |
|       residual_coding( xC, yC, Log2( wC ), Log2( hC ), 1 ) | |
|     else | |
|       residual_ts_coding( xC, yC, Log2( wC ), Log2( hC ), 1 ) | |
|   } | |
|   if( tu_cr_coded_flag[ xC ][ yC ] && treeType != DUAL_TREE_LUMA && | |
|   !( tu_cb_coded_flag[ xC ][ yC ] && tu_joint_cbcr_residual_flag[ xC ][ yC ] ) ) { | |
|     if( sps_transform_skip_enabled_flag && | |
|     !BdpcmFlag[ x0 ][ y0 ][ 2 ] && | |
|       wC <= MaxTsSize && hC <= MaxTsSize && | |
|       !cu_sbt_flag ) | |
|       transform_skip_flag[ xC ][ yC ][ 2 ] | ae(v) |
|     if( !transform_skip_flag[ xC ][ yC ][ 2 ] \|\| sh_ts_residual_coding_disabled_flag ) | |
|       residual_coding( xC, yC, Log2( wC ), Log2( hC ), 2 ) | |
|     else | |
|       residual_ts_coding( xC, yC, Log2( wC ), Log2( hC ), 2 ) | |
|   } | |
| } | |

TABLE 4

Proposed DST-IV/TrSkip flag

| |
|---|
| if( treeType != DUAL_TREE_CHROMA && |
|   lfnst_idx == 0 && |
|   transform_skip_flag[ x0 ][ y0 ][ 0 ] == 0 && |
|   Max( cbWidth, cbHeight ) <= 32 && |

TABLE 4-continued

Proposed DST-IV/TrSkip flag

| | |
|---|---|
|   IntraSubPartitionsSplitType == ISP_NO_SPLIT && cu_sbt_flag == 0 && MtsZeroOutSigCoeffFlag == 1 && MtsDcOnly == 0 ) { | |
|   if( ( ( CuPredMode[ chType ][ x0 ][ y0 ] == MODE_INTER && | |
|     sps_explicit_mts_inter_enabled_flag ) \|\| | |
|     ( CuPredMode[ chType ][ x0 ][ y0 ] == MODE_INTRA && | |
|     sps_explicit_mts_intra_enabled_flag ) ) ) | |
|     mts_idx | ae(v) |
| } | |
| if( treeType != DUAL_TREE_CHROMA && | |
|   lfnst_idx == 0 && | |
|     hybrid_transform_skip_flag[ x0 ][ y0 ][ 0 ] == 1 | |
|   && Max( cbWidth, cbHeight ) <= 32 && | |
|     IntraSubPartitionsSplitType == ISP_NO_SPLIT && cu_sbt_flag == 0 && | |
|     MtsZeroOutSigCoeffFlag == 1 && MtsDcOnly == 0 ) { | |
|   if( ( ( CuPredMode[ chType ][ x0 ][ y0 ] == MODE_INTER && | |
|     sps_explicit_mts_inter_enabled_flag ) \|\| | |
|     ( CuPredMode[ chType ][ x0 ][ y0 ] == MODE_INTRA && | |
|     sps_explicit mts_intra_enabled_flag ) ) ) | |
|     dst_iv_hybrid_transform_skip_flag | |
| } | |

If Implicit transform is used, hybrid transform skip mode also use implicit transform in the combination with transform skip.

Figure 16:
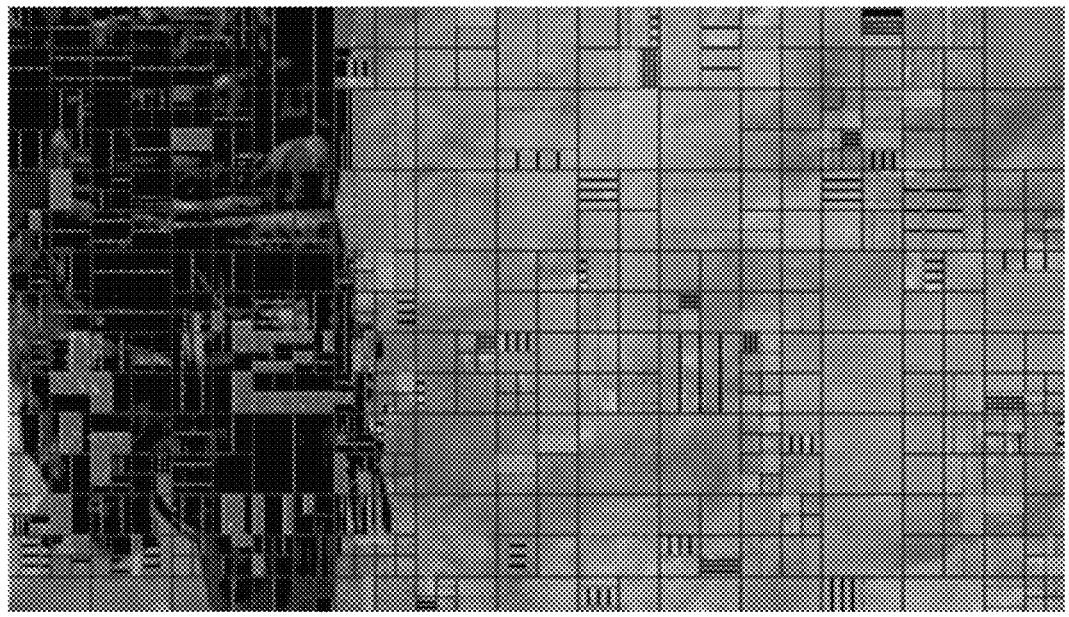
FIG. 16 illustrates usage of transform skip in VTM 11.0.
Figure 17:
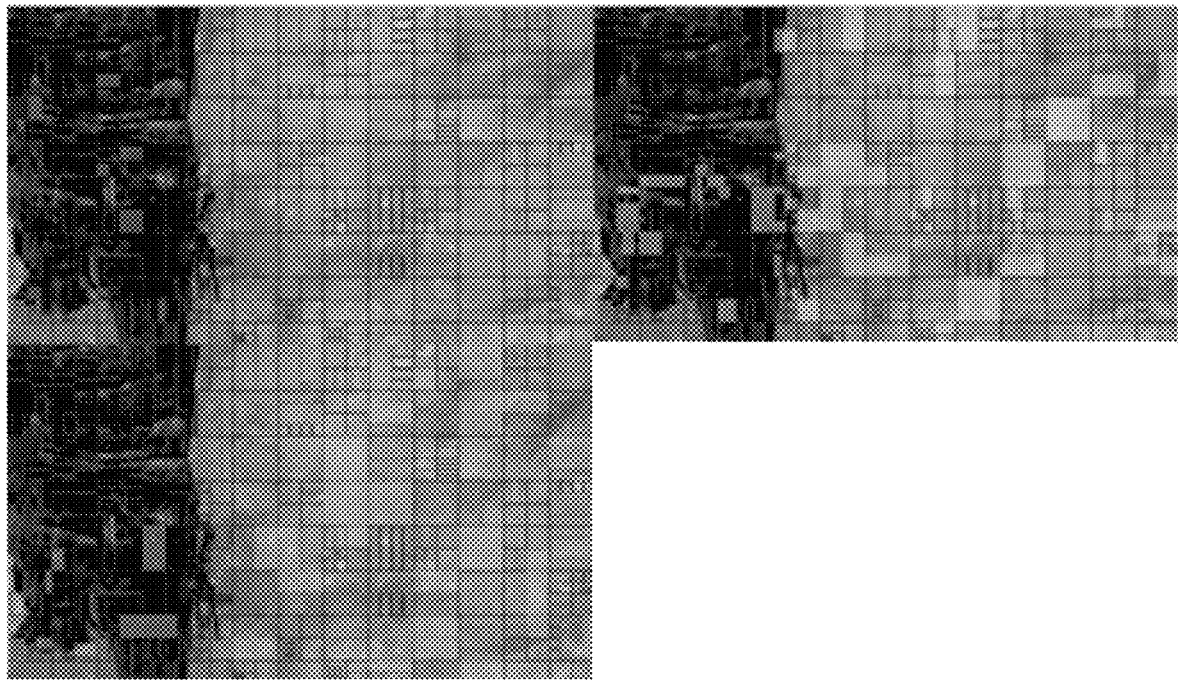
FIG. 17 illustrates transform mode with proposed method.

In FIG. 16, we see the transform selection, with the proposed method, and we can see that for this sequence that DCT-II/TrSkip and DST-IV/Trskip are highly selected and are much more selected than TransformSkip.

Use of Implicit Transform in Combination with Transform Skip

In another embodiment, to reduce the encoder complexity, there is no competition between DCT-II/TrSkip and DST-IV/TrSkip mode but only implicit transform is used in combination with Transform skip. Reminder, in VVC, when implicit transform is used the transform used in one given direction are derived following the equation:

$$trTypeHor = (width >= 4 \&\& width <= 16)?DST\text{-}IV:DCT\text{-}II$$

$$trTypeVer = (height >= 4 \&\& height <= 16)?DST\text{-}IV:DCT\text{-}II \quad \text{Equation 1:}$$

Zeroing-Out and QP Offset

In another embodiment, zeroing-out is applied to the regular transform part of the hybrid transform skip mode. This zeroing-out enables to reduce the high-frequency residual because it is partially redundant with the transform skip part of this hybrid mode.

This zeroing-out becomes normative if the hybrid_transform_flag is coded after residual decoding process and with conditions on the positions of the last non-zero coefficient.

In a variant, and may be combine with zeroing-out, a QP offset may be applied to regular transform or/and transform skip part of this hybrid transform mode.

Reduce Transform Skip Coefficients Value

A detection method is used to detect particles, this method detects differences between original residual of a given sample with surrounding residual samples. For all previous embodiments, this method was encoder-only, and at the decoder only a simple addition between regular and transform skip residual.

Figure 18:
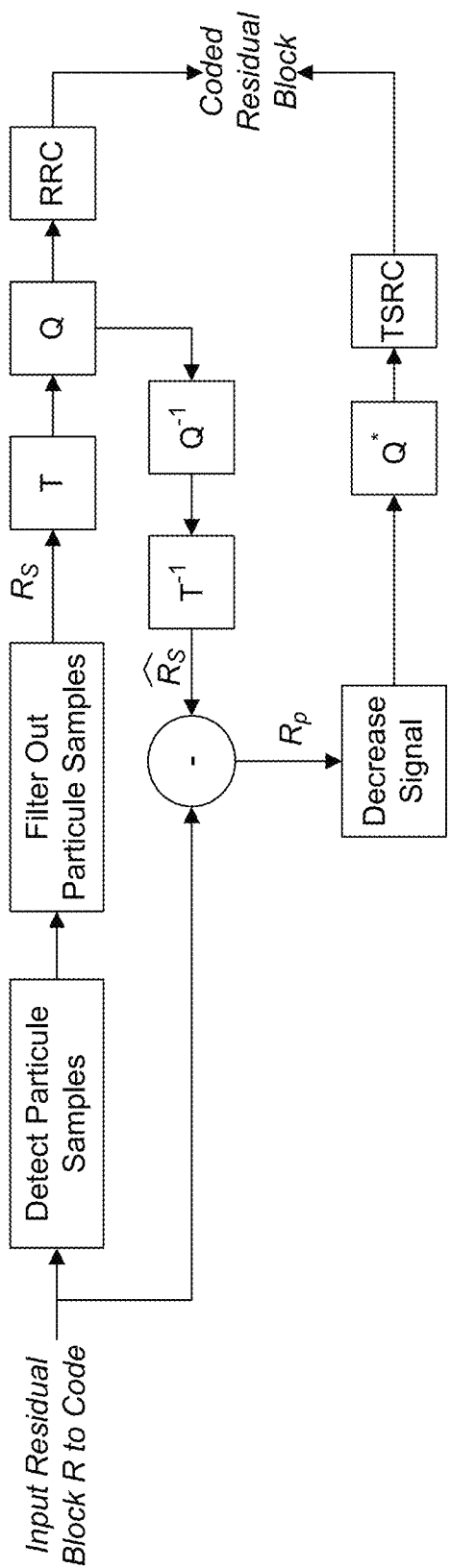
FIG. 18 illustrates an encoder scheme of the proposed improved embodiment.
Figure 19:
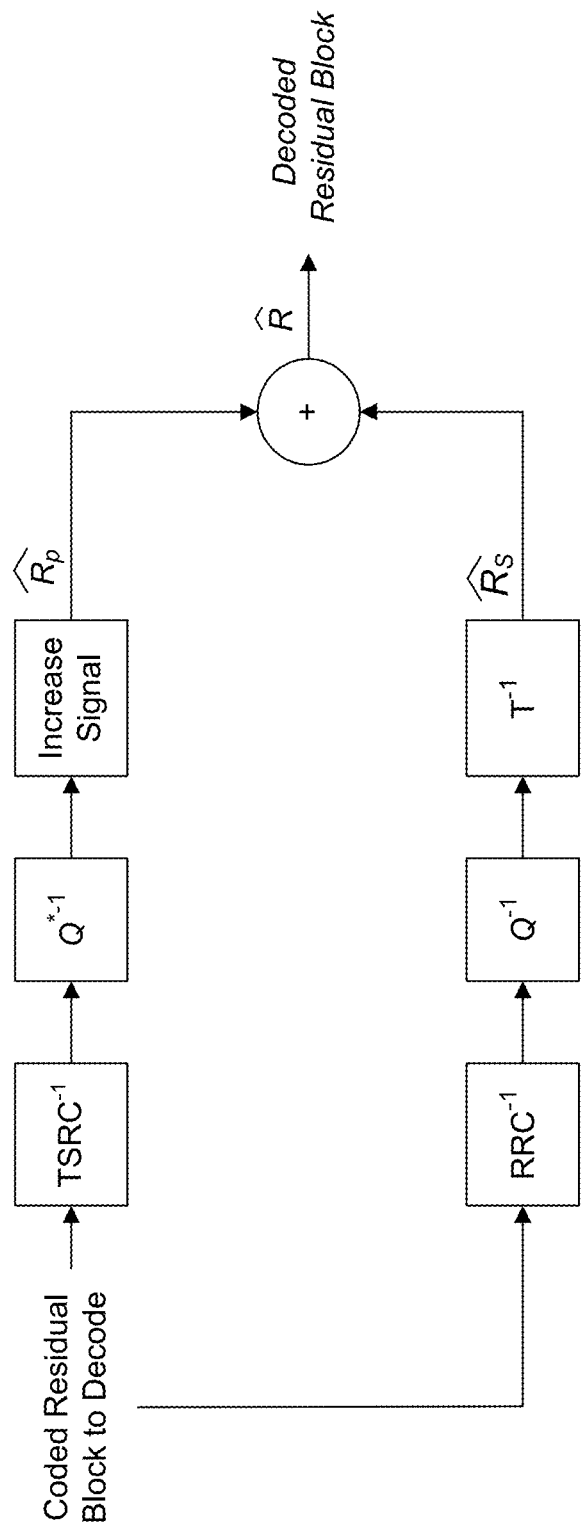
FIG. 19 illustrates a decoder scheme of the proposed improved embodiment.

In this embodiment, a decrease signal step is added to the encoder to reduce the amplitude of the signal of the transform skip part of the residual, as shown in FIG. 18. At the decoder side, an increase signal step is added after inverse quantization of the transform skip part of the signal, as shown in FIG. 19. A fixed value is added to all non-zero coefficients of the transform skip part.

In the first step, detection of the particles, a filter is used to detect the residual samples that will be coded with the transform skip part. This detection includes a threshold between current residual sample and the neighbor's samples. This means that all the residual samples coded with the transform skip part have an absolute value greater than this threshold plus or minus the quantization step. By removing the value of this threshold from the absolute value of the residual sample, the cost of the transform skip part of the residual will be reduced. A previous section described a 2D convolution method.

One drawback of this method is that it is only local, and if many particles are neighbors, they will be more difficult to detect.

Median Search

Another method to detect particles is to compute the median value over all residual sample values. This method is non-local, so more robust when particles are in the same neighborhood.

By thresholding each sample, an isolated sample $f_{curr}$ is said to be isolated if:

$$|f_{curr} - (f_{median})| > T$$

where T is a pre-specified positive threshold.

Once these isolated sample values are detected, they are filtered out from the residual block by replacing them by the median value or an average of neighboring samples.

Number of Contexts Coded Bins

In VVC, a maximum number of context coded bins has been introduced to simplify the parsing process of residual coefficients. In Table 5, remBinsPass1 variable indicates the remaining number of context coded bins allowed for the regular residual of current coding unit.

TABLE 5

| residual_coding syntax in VVC | |
|---|---|
| | Descriptor |
| residual_coding( x0, y0, log2TbWidth, log2TbHeight, cIdx ) { | |
| ...... | |
|   log2Tb Width = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   .......... | |
|     for( n = firstPosMode0; n >= 0 && remBinsPass1 >= 4; n- - ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] && ( n > 0 | | | |

TABLE 5-continued

| residual_coding syntax in VVC | |
|---|---|
| | Descriptor |
|       !inferSbDcSigCoeffFlag ) && ( xC != LastSignificantCoeffX | | yC != LastSignificantCoeffY ) ) { | |
|         sig_coeff_flag[ xC ][ yC ] | ae(v) |
|         remBinsPass1- - | |
|         if( sig_coeff_flag[ xC ][ yC ] ) | |
|           inferSbDcSigCoeffFlag = 0 | |
|       } | |
|       if( sig_coeff_flag[ xC ][ yC ] ) { | |
|         abs_level_gtx_flag[ n ][ 0 ] | ae(v) |
|         remBinsPass1- - | |
|         if( abs_level_gtx_flag[ n ][ 0 ] ) { | |
|           par_level_flag[ n ] | ae(v) |
|           remBinsPass1- - | |
|           abs_level_gtx_flag[ n ][ 1 ] | ae(v) |
|           remBinsPass1- - | |
|         } | |
|         if( lastSigScanPosSb = = -1 ) | |
|           lastSigScanPosSb = n | |
|         firstSigScanPosSb = n | |
|       } | |
| ......... | |
| } | |

In Table 6, remBinsCCbs variable indicates the remaining number of context coded bins allowed for the transform skip residual of current coding unit.

TABLE 6

| transform skip residual_coding syntax in VVC | |
|---|---|
| | Descriptor |
| residual_ts_coding( x0, y0, log2TbWidth, log2TbHeight, cIdx ) { | |
|   ....... | |
|   numSbCoeff = 1 << ( log2SbW + log2SbH ) | |
|   lastSubBlock = ( 1 << ( log2TbWidth + log2TbHeight - ( log2SbW + log2SbH ) ) ) - 1 | |
|   inferSbCbf = 1 | |
|   RemCcbs = ( ( 1 << ( log2TbWidth + log2TbHeight ) ) * 7 ) >> 2 | |
|   ......... | |
|     for( n = 0; n <= numSbCoeff - 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       lastScanPosPass1 = n | |
|       if( sb_coded_flag[ xS ][ yS ] && ( n != numSbCoeff - 1 | | !inferSbSigCoeffFlag ) ) { | |
|         sig_coeff_flag[ xC ][ yC ] | ae(v) |
|         RemCcbs- - | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] ) { | |
|         coeff_sign_flag[ n ] | ae(v) |
|         RemCcbs- - | |
|         CoeffSignLevel[ xC ][ yC ] = ( coeff_sign_flag[ n ] > 0 ? -1 : 1 ) | |
|         abs_level_gtx_flag[ n ][ 0 ] | ae(v) |
|         RemCcbs- - | |
|         if( abs_level_gtx_flag[ n ][ 0 ] ) { | |
|           par_level_flag[ n ] | ae(v) |
|           RemCcbs- - | |
|         } | |
|       } | |

TABLE 6-continued transform skip residual_coding syntax in VVC

| | Descriptor |
|---|---|
|     AbsLevelPass1[ xC ][ yC ] =<br>      sig_coeff_flag[ xC ][ yC ] + par_level_flag[ n<br>      ] + abs_level_gtx_flag[ n ][ 0 ]<br>    }<br>/* Greater than X scan pass (numGtXFlags=5) */<br>  lastScanPosPass2 = −1<br>  for( n = 0; n <= numSbCoeff − 1 && RemCcbs >= 4;<br>  n++ ) {<br>    xC = ( xS << log2SbW ) + DiagScanOrder[<br>    log2SbW ][ log2SbH ][ n ][ 0 ]<br>    yC = ( yS << log2SbH ) + DiagScanOrder[<br>    log2SbW ][ log2SbH ][ n ][ 1 ]<br>    AbsLevelPass2[ xC ][ yC ] = AbsLevelPass1[ xC ][<br>    yC ]<br>    for( j = 1; j < 5; j++ ) {<br>      if( abs_level_gtx_flag[ n ][ j − 1 ] ) {<br>        abs_level_gtx_flag[ n ][ j ]<br>        RemCcbs− −<br>      }<br>      AbsLevelPass2[ xC ][ yC ] += 2 *<br>      abs_level_gtx_flag[ n ][ j ]<br>    }<br>    lastScanPosPass2 = n<br>  .........<br>}<br>} | <br><br><br><br><br><br><br><br><br><br><br><br><br><br><br><br><br><br><br>ae(v) |

As both regular and transform skip coefficients are coded, more context coded bins may be coded in the bitstream. In this embodiment it is proposed to count the number of context coded bins across both regular and transform skip residual coding. Table 7 shows the modified initialization of RemCcbs variable with the remBinsPass1 from regular residual coding.

TABLE 7

Proposed initialization of RmCcbs
for transform skip residual coding

| | Descriptor |
|---|---|
| residual_ts_coding( x0, y0, log2TbWidth, log2TbHeight,<br>cIdx, remBinsPass1 ) {<br>  .......<br>  numSbCoeff = 1 << ( log2SbW + log2SbH )<br>  lastSubBlock = ( 1 << ( log2TbWidth + log2TbHeight −<br>  ( log2SbW + log2SbH ) ) ) − 1<br>  inferSbCbf = 1<br>  RemCcbs = remCcbsFromReg<br>  ........<br>    for( n = 0; n <= numSbCoeff − 1 && RemCcbs >= 4;<br>    n++ ) {<br>      xC = ( xS << log2SbW ) + DiagScanOrder[<br>      log2SbW ][ log2SbH ][ n ][ 0 ]<br>      yC = ( yS << log2SbH ) + DiagScanOrder[<br>      log2SbW ][ log2SbH ][ n ][ 1 ]<br>      lastScanPosPass1 = n<br>      if( sb_coded_flag[ xS ][ yS ] &&<br>        ( n != numSbCoeff − 1 | | !inferSbSigCoeffFlag<br>      ) ) {<br>        sig_coeff_flag[ xC ][ yC ]<br>        RemCcbs− −<br>        if( sig_coeff_flag[ xC ][ yC ] )<br>          inferSbSigCoeffFlag = 0<br>      }<br>      CoeffSignLevel[ xC ][ yC ] = 0<br>      if( sig_coeff_flag[ xC ][ yC ] ) {<br>        coeff_sign_flag[ n ]<br>        RemCcbs− −<br>        CoeffSignLevel[ xC ][ yC ] = ( coeff_sign_flag[<br>        n ] > 0 ? −1 : 1 )<br>        abs_level_gtx_flag[ n ][ 0 ]<br>        RemCcbs− − | <br><br><br><br><br><br><br><br><br><br><br><br><br><br><br><br><br><br><br>ae(v)<br><br><br><br><br><br>ae(v)<br><br><br><br><br>ae(v) |

TABLE 7-continued

Proposed initialization of RmCcbs
for transform skip residual coding

| | Descriptor |
|---|---|
|       if( abs_level_gtx_flag[ n ][ 0 ] ) {<br>        par_level_flag[ n ]<br>        RemCcbs− −<br>      }<br>    }<br>    AbsLevelPass1[ xC ][ yC ] =<br>      sig_coeff_flag[ xC ][ yC ] + par_level_flag[<br>      n ] + abs_level_gtx_flag[ n ][ 0 ]<br>    }<br>/* Greater than X scan pass (numGtXFlags=5) */<br>  lastScanPosPass2 = −1<br>  for( n = 0; n <= numSbCoeff − 1 && RemCcbs >= 4;<br>  n++ ) {<br>    xC = ( xS << log2SbW ) + DiagScanOrder[<br>    log2SbW ][ log2SbH ][ n ][ 0 ]<br>    yC = ( yS << log2SbH ) + DiagScanOrder[<br>    log2SbW ][ log2SbH ][ n ][ 1 ]<br>    AbsLevelPass2[ xC ][ yC ] = AbsLevelPass1[ xC ][<br>    yC ]<br>    for( j = 1; j < 5; j++ ) {<br>      if( abs_level_gtx_flag[ n ][ j − 1 ] ) {<br>        abs_level_gtx_flag[ n ][ j ]<br>        RemCcbs− −<br>      }<br>      AbsLevelPass2[ xC ][ yC ] += 2 *<br>      abs_level_gtx_flag[ n ][ j ]<br>    }<br>    lastScanPosPass2 = n<br>  .........<br>} | <br>ae(v)<br><br><br><br><br><br><br><br><br><br><br><br><br><br><br><br><br><br>ae(v) |

TABLE 8

Shared remBinPass1 variable across
residual and residual_ts coding

| | Descriptor |
|---|---|
| transform_unit( x0, y0, tbWidth, tbHeight, treeType,<br>subTuIndex, chType ) {<br>  .....<br>  if( tu_y_coded_flag[ x0 ][ y0 ] && treeType !=<br>  DUAL_TREE_CHROMA ) {<br>    if( sps_transform_skip_enabled_flag &&<br>    !BdpcmFlag[ x0 ][ y0 ][ 0 ] &&<br>      tbWidth <= MaxTsSize && tbHeight <=<br>      MaxTsSize &&<br>      ( IntraSubPartitionsSplitType = =<br>      ISP_NO_SPLIT ) && !cu_sbt_flag )<br>      transform_skip_flag[ x0 ][ y0 ][ 0 ]<br>    if( transform_skip_flag[ x0 ][ y0 ][ 0 ] )<br>      hybrid_transform_skip_flag[ x0 ][ y0 ][ 0 ]<br>remBinsPass1 = ( ( 1 << ( log2TbWidth + log2TbHeight ) )<br>* 7 ) >> 2<br>    if( !transform_skip_flag[ x0 ][ y0 ][ 0 ] | |<br>    sh_ts_residual_coding_disabled_flag<br>      | | hybrid_transform_skip_flag[ x0 ][ y0 ][ 0 ] )<br>      residual_coding( x0, y0, Log2( tbWidth ), Log2(<br>      tbHeight ), 0, remBinsPass1 )<br>    else<br>      residual_ts_coding( x0, y0, Log2( tbWidth ), Log2(<br>      tbHeight ), 0, remBinsPass1 )<br>    if( hybrid_transform_skip_flag[ x0 ][ y0 ][ 0 ] )<br>      residual_ts_coding( x0, y0, Log2( tbWidth ), Log2(<br>      tbHeight ), 0, remBinsPass1 )<br>  }<br>} | <br><br><br><br><br><br><br><br><br><br>ae(v)<br><br> |

In a variant, transform_skip residual is coded before regular one to benefits from a bigger number of context coded bins.

Encoder-Only Improvement

Loop Over Threshold

Figure 20:
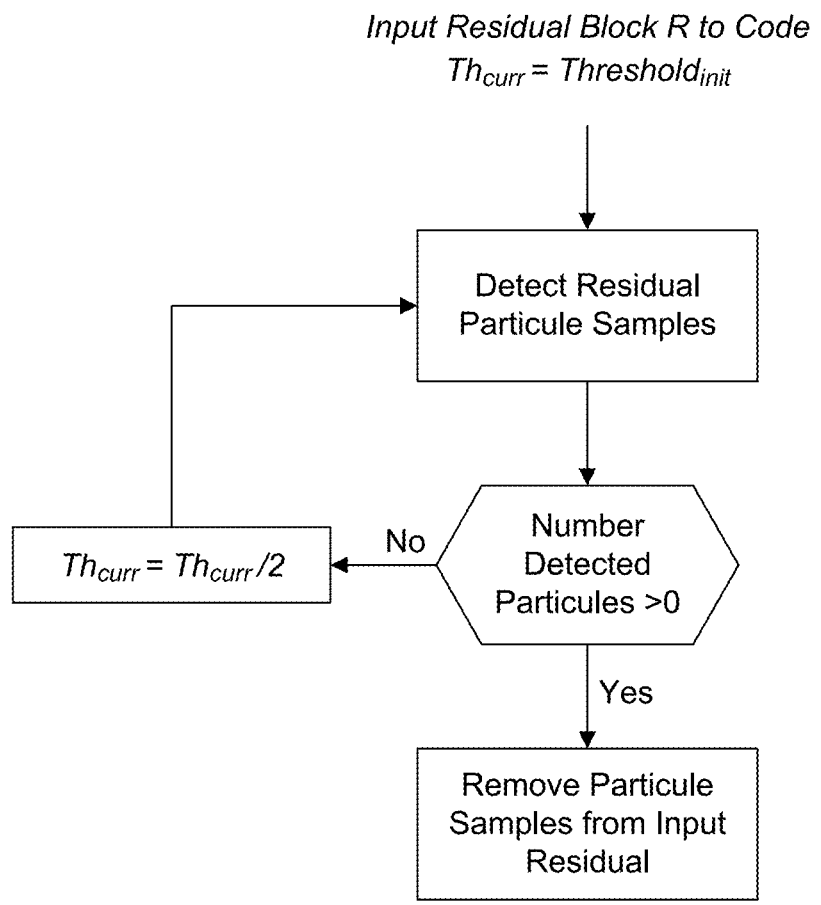
FIG. 20 illustrates a flowchart of the loop over threshold to detect particles

During the detect particles samples step of FIG. 18, the number of detected particles may be zero if threshold is too big. In this embodiment, while the number of detected particles is equal to 0, the threshold used for detection is decreased by half, as shown in FIG. 20, it enables to detect smaller differences when the input signal contains particles with less intensity.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
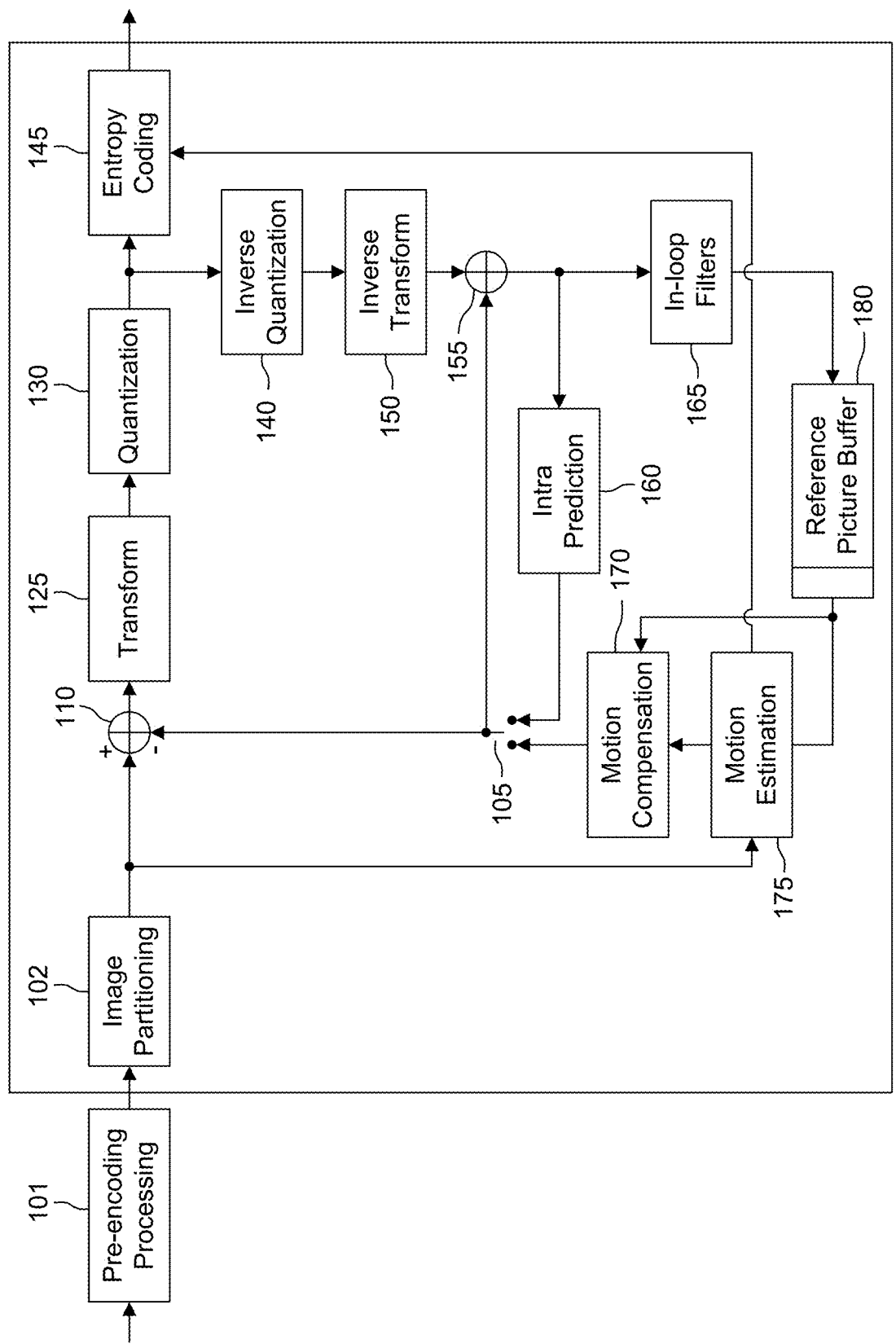
FIG. 1 illustrates a generic video compression scheme.
Figure 2:
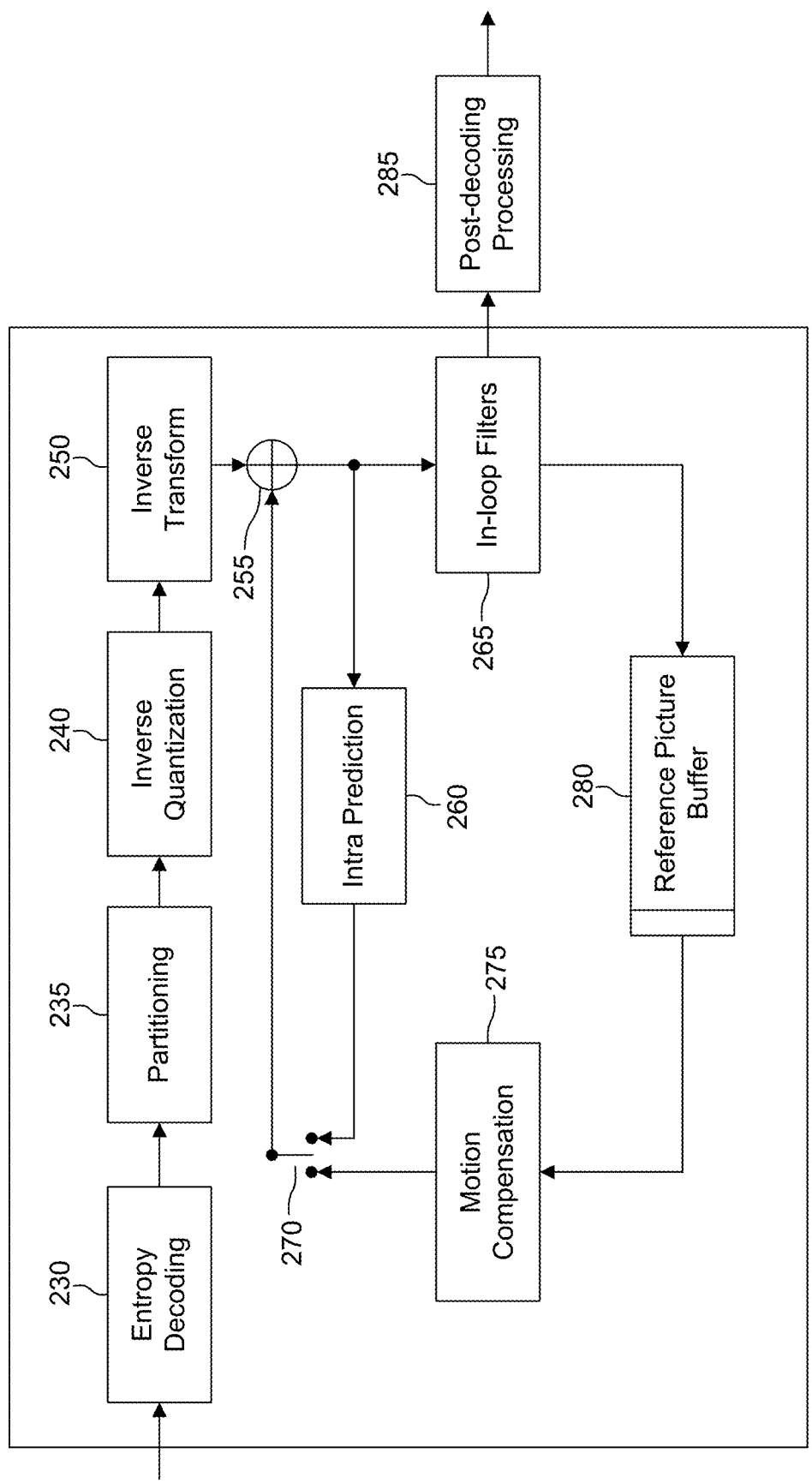
FIG. 2 illustrates a generic video decompression scheme.

The aspects described and contemplated in this application can be implemented in many different forms. FIGS. 1, 2, and 3 provide some embodiments, but other embodiments are contemplated and the discussion of FIGS. 1, 2, and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, Cus. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple Ics, and/or discrete components. For example, in at least one embodiment, the processing and encoder/decoder elements of system 1000 are distributed across multiple Ics and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010, as necessary. Similarly, aspects of USB or HDMI interface processing can be implemented within separate interface Ics or within processor 1010, as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

Any of the above embodiments, further comprising signaling that indicates hybrid transform skip mode.

Any of the above embodiments, wherein hybrid texture is used in combination with either DCT-II or DST-IV.

Any of the above embodiments, wherein implicit transform is used in combination with Transform skip.

Any of the above embodiments, further comprising counting a number of context coded bins across both regular and transform skip residual coding.

Any of the above embodiments, wherein if a number of detected particles is equal to 0, the threshold used for detection is decreased, and if the number of detected particles is nonzero, an original threshold is used for detection.

The invention claimed is:

1. A method for video coding, comprising:
   detecting one or more particle samples from a residual of a video block being coded;
   filtering out the one or more particle samples from the residual of the video block to form a first residual;
   coding the first residual, wherein the first residual is transformed, quantized, and entropy coded;
   obtaining a second residual representing the one or more particle samples; and
   coding the second residual, wherein the second residual is quantized and is entropy coded.

2. An apparatus for video coding, comprising:
   at least one processor; and
   memory storing instructions that, when executed by the at least one processor, cause the apparatus to:
   detect one or more particle samples from a residual of a video block being coded,
   filter out the one or more particle samples from the residual of the video block to form a first residual,
   code the first residual, wherein the first residual is transformed, quantized, and entropy coded,
   obtain a second residual representing the one or more particle samples, and
   code the second residual, wherein the second residual is quantized and is entropy coded.

3. The method of claim 1, wherein the obtaining of the second residual comprises:
   reconstructing the coded first residual; and
   subtracting the reconstructed first residual from the residual of the video block to form the second residual.

4. The method of claim 1, wherein the obtaining of the second residual comprises:
   forming the second residual out of the detected one or more particle samples, wherein the remaining samples are set to zero.

5. The method of claim 1, wherein the filtering out of the one or more particle samples from the residual of the video block to form the first residual comprises:

replacing a particle sample, of the one or more particle samples, with a value derived from the values of neighboring samples.

6. A method for video decoding, comprising:
decoding from a bitstream a first residual, including entropy decoding a quantized first residual, inverse quantizing the quantized first residual, and inverse transforming the dequantized first residual to form a reconstructed first residual;
decoding from the bitstream a second residual, including entropy decoding a quantized second residual and inverse quantizing the quantized second residual to form a reconstructed second residual; and
reconstructing a residual of a video block being decoded by combining the reconstructed first residual and the reconstructed second residual.

7. The method of claim 6, further comprising:
decoding from the bitstream a syntax element indicating a hybrid residual coding mode, wherein the decoding of the first residual and the decoding of the second residual are performed based on the syntax element.

8. The method of claim 6, wherein the reconstructing of the residual of the video block comprises:
adding the reconstructed first residual to the reconstructed second residual.

9. The method of claim 6, wherein the reconstructing of the residual of the video block comprises:
merging the reconstructed first residual and the reconstructed second residual.

10. The method of claim 6, further comprising:
reconstructing the video block by adding the reconstructed residual of the video block to a prediction of the video block in a decoder.

11. The method of claim 1, further comprising:
reconstructing the first residual and the second residual;
combining the reconstructed first residual and second residual to form a reconstructed residual of the video block; and
reconstructing the video block by adding the reconstructed residual of the video block to a prediction of the video block in an encoder.

12. The method of claim 1, wherein the coding of the first residual and the coding of the second residual is performed in a hybrid residual coding mode, and further comprising:
signaling an indication indicating the hybrid residual coding mode.

13. The method of claim 1, wherein the transforming of the first residual is performed with either DCT-II or DST-IV transforms.

14. The method of claim 1, wherein the transforming of the first residual is performed based on a transform selected based on a size of the first residual.

15. The method of claim 1, wherein the entropy coding of the first residual and the second residual is performed based on a number of context coded bins allocated based on a budget for both the first and the second residual blocks.

16. The method of claim 1, wherein the detecting comprises:
processing the video block to detect the one or more particle samples using a threshold; and
if a number of detected particles is equal to 0, the processing of the video block is repeated using a decreased threshold.

17. A non-transitory computer readable medium containing data content generated according to the method of claim 1 for playback using a processor.

18. The apparatus of claim 2, wherein the instructions further cause the apparatus to:
reconstruct the first residual and the second residual;
combine the reconstructed first residual and second residual to form a reconstructed residual of the video block; and
reconstruct the video block by adding the reconstructed residual of the video block to a prediction of the video block in an encoder.

19. The apparatus of claim 2, wherein the coding of the first residual and the coding of the second residual is performed in a hybrid residual coding mode, and wherein the instructions further cause the apparatus to:
signal an indication indicating the hybrid residual coding mode.

20. The apparatus of claim 2, wherein the transforming of the first residual is performed with either DCT-II or DST-IV.

21. The apparatus of claim 2, wherein the transforming of the first residual is performed based on a transform selected based on a size of the first residual.

22. The apparatus of claim 2, wherein the entropy coding of the first residual and the second residual is performed based on a number of context coded bins allocated based on a budget for both the first and the second residual blocks.

23. The apparatus of claim 2, wherein the detecting comprises:
processing the video block to detect the one or more particle samples using a threshold; and
if a number of detected particles is equal to 0, the processing of the video block is repeated using a decreased threshold.

24. The method of claim 1, wherein the first residual is quantized with a first quantization step and the second residual is quantized with a second quantization step.

25. The apparatus of claim 2, wherein the first residual is quantized with a first quantization step and the second residual is quantized with a second quantization step.

26. The apparatus of claim 6, wherein the inverse quantizing of the quantized first residual and the inverse quantizing of the quantized second residual is according to a different quantization steps.

* * * * *